Dec. 31, 1935.    C. A. RENNICK ET AL    2,025,774
ELECTRICAL GAUGE
Original Filed Oct. 11, 1927    4 Sheets-Sheet 1
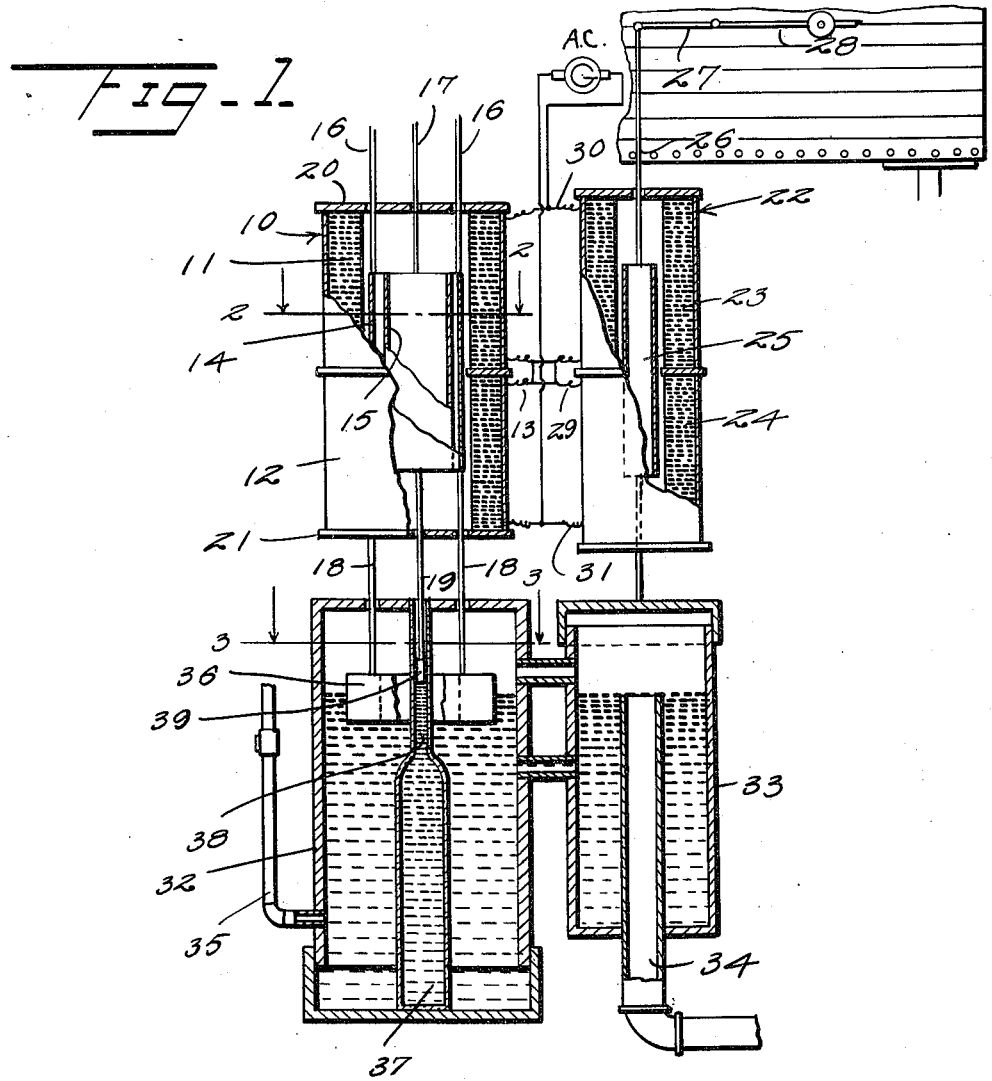
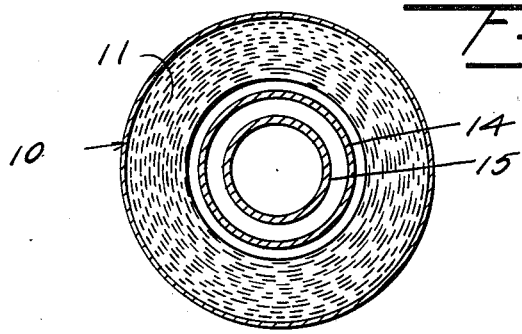
Inventors
C. A. Rennick
O. B. Curry
By Watson E. Coleman
Attorney

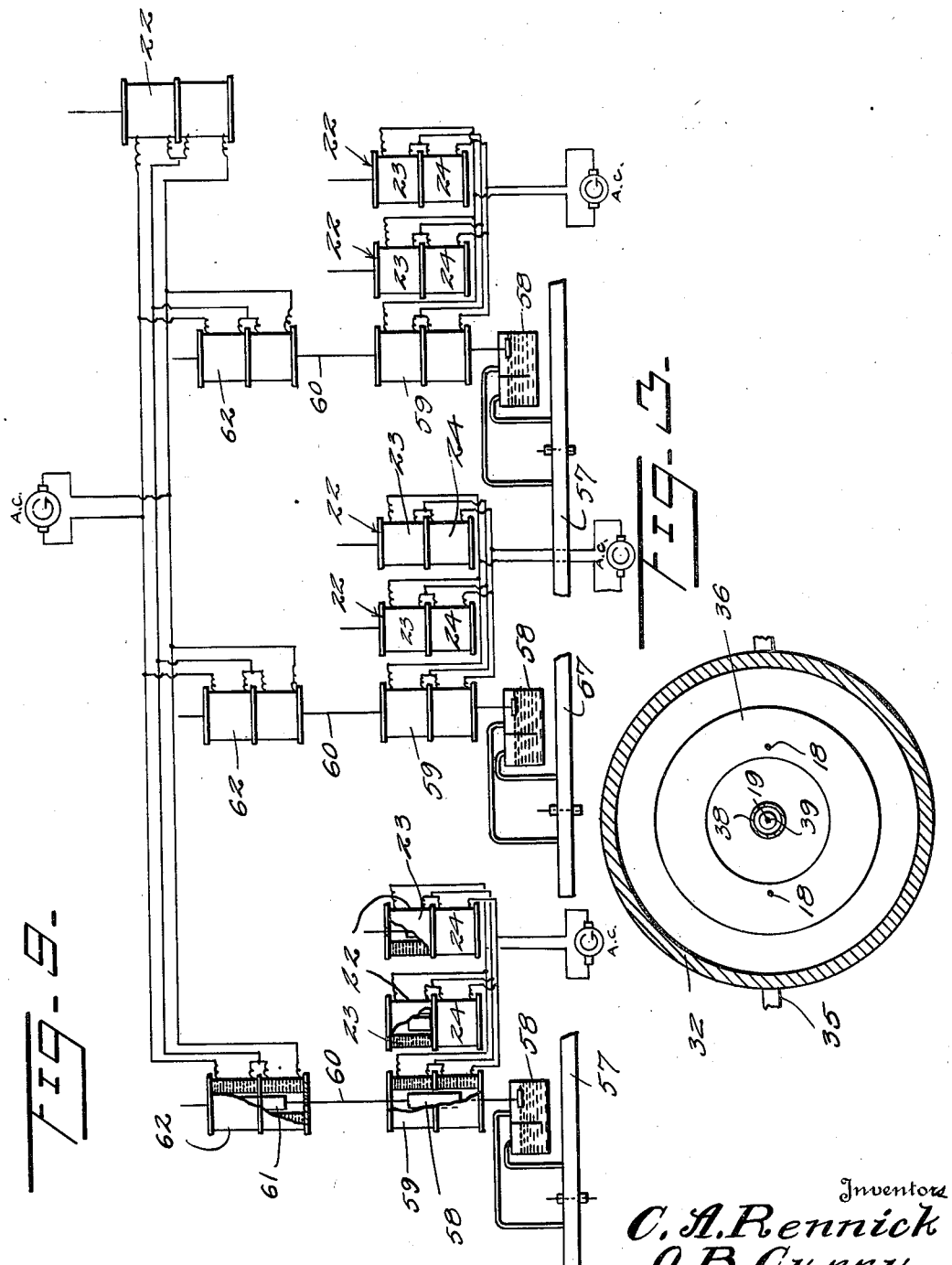

Dec. 31, 1935.  C. A. RENNICK ET AL  2,025,774
ELECTRICAL GAUGE
Original Filed Oct. 11, 1927  4 Sheets-Sheet 3
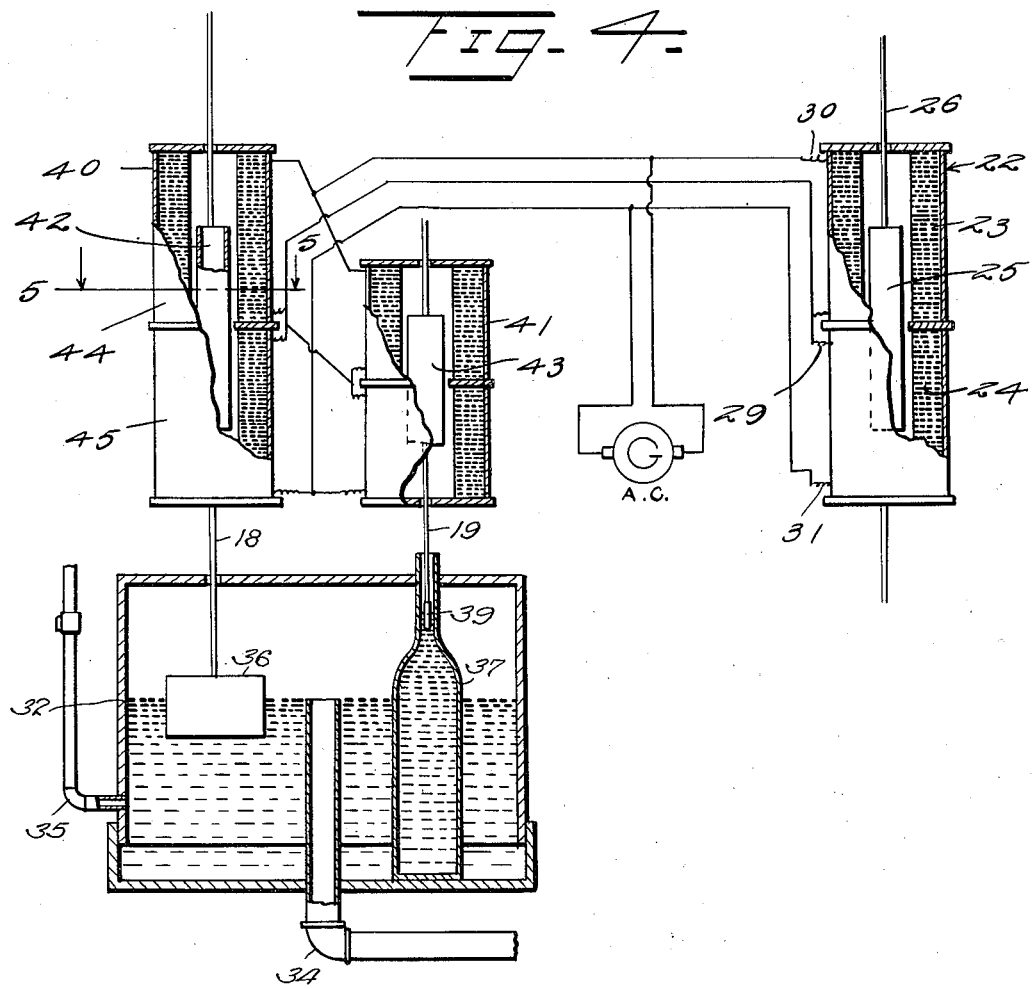
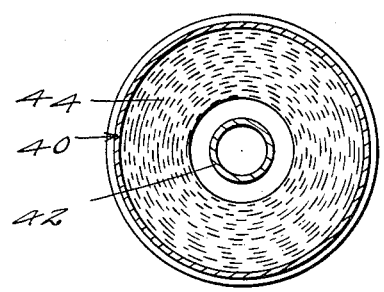
Inventors
C. A. Rennick
O. B. Curry
By Watson E. Coleman
Attorney Dec. 31, 1935.  C. A. RENNICK ET AL  2,025,774
ELECTRICAL GAUGE
Original Filed Oct. 11, 1927  4 Sheets-Sheet 4
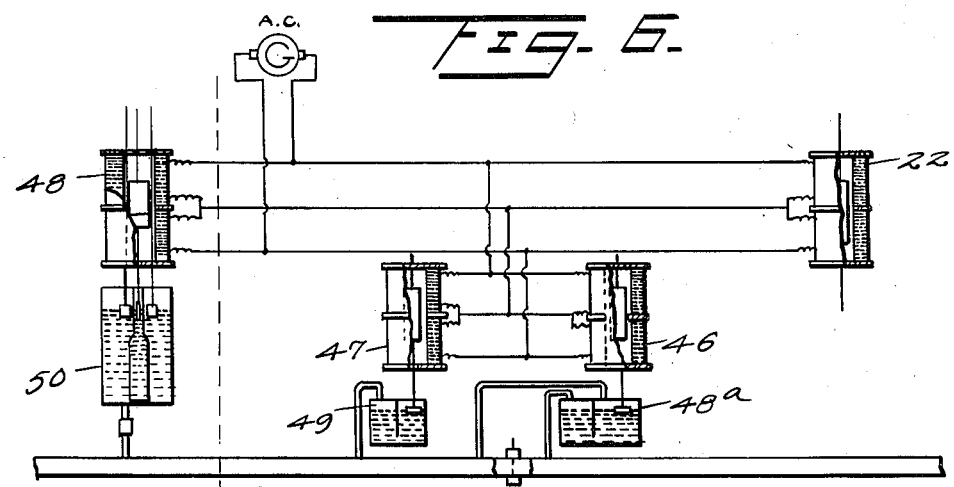
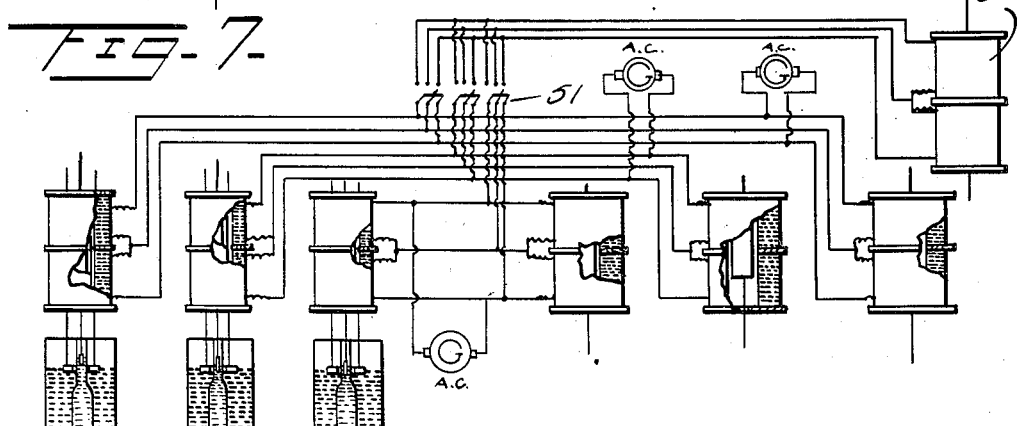
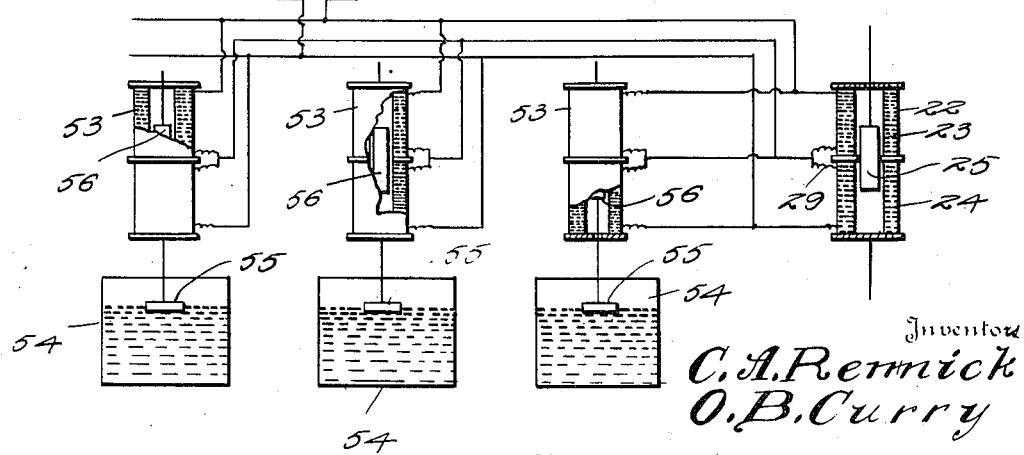
Inventors
C. A. Rennick
O. B. Curry
By Watson E. Coleman
Attorney Patented Dec. 31, 1935

2,025,774

UNITED STATES PATENT OFFICE 2,025,774

ELECTRICAL GAUGE

Clarence A. Rennick and Oliver B. Curry,
El Dorado, Kans.

Application October 11, 1927, Serial No. 225,515
Renewed December 30, 1932

4 Claims. (Cl. 177—351)

This invention relates to electrical gauges and more particularly to a device of this character operating an indicator through an armature, the position of which is controlled by the effective field of a multi-section coil.

An important object of the invention is to provide a device of this character which may be very readily and cheaply produced and which readily lends itself to use in gauges where compensation must be had for one or more factors effecting the accuracy of the final reading which would be obtained by direct gauging.

A further and more specific object of the invention is the production of a gauge embodying multi-sectional control and operating coils connected in parallel across a source of E. M. F. and to one another in such manner that upon the introduction of impedance in the field of any of the sections of the control coil, a corresponding fluctuation of the current flow will occur in the corresponding section of the operating coil, so that the position of an armature associated therewith will be affected and an indicating mechanism controlled through this armature will be actuated.

A further and more specific object of the invention is to provide a compensating electrical hydrometer including a novel and improved control mechanism.

These and other objects we attain by the construction shown in the accompanying drawings, wherein for the purpose of illustration is shown a preferred embodiment of our invention and wherein:—

Figure 1 is a diagrammatic view partially in section of a gauge constructed in accordance with our invention;

Figure 2 is a section on the line 2—2 of Figure 1;

Figure 3 is a section on the line 3—3 of Figure 1;

Figure 4 is a view showing a slightly modified gauge construction;

Figure 5 is a section on the line 5—5 of Figure 4;

Figure 6 is a view showing a gauge construction suitable for use in obtaining a corrected flow reading;

Figure 7 is a diagrammatic view showing how a plurality of gauges constructed in accordance with our invention may be connected for obtaining direct readings at two different points;

Figure 8 is a view showing a gauge constructed in accordance with our invention for indicating the total contents of a plurality of tanks;

Figure 9 is a diagrammatic view showing how a plurality of the gauges may be operated from a single variable control element.

Referring now to the drawings and more particularly to Figure 1 thereof, the numeral 10 generally designates a control coil formed in two sections 11 and 12 arranged in end to end relation and having their adjacent ends electrically connected, as indicated at 13. Vertically shiftable within the coil 10 are concentric iron sleeves 14 and 15 which are maintained in concentric relation to the coils by guide rods 16 and 17 respectively and by operating rods 18 and 19. The rods 16, 17, 18 and 19 extend through guide openings formed in end members 20 and 21 of the coil.

The numeral 22 generally designates a control coil likewise formed in two sections, designated at 23 and 24. Slidable within the coil 22 is an armature 25 in the form of a soft iron sleeve to which is connected one end of an operating guide rod 26, the opposite end of which is connected to an indicating or recording pen 27. This indicating pen is preferably provided with a balance weight 28 counterbalancing or nearly counterbalancing the sleeve 25. It is preferred that this weight be just insufficient to counterbalance the sleeve, so that in event the coil 22 becomes de-energized, the sleeve moving downwardly will shift the indicator pen 27 to a sub-zero position indicating inoperation.

Adjacent ends of the coils 23 and 24 are connected with one another at 29, while the free end of the coil 23 is connected with the free end of the coil 11, at 30, and the free end of the coil 24 is connected to the free end of the coil 12 at 31. To the connections 30 and 31 are connected the terminals of a one hundred and ten volt alternating current supply, generally designated by a generator G. It will be obvious that by these connections, the coils 10 and 22 are placed in parallel, and freed from the consideration of the elements 14, 15 and 25, the current flow therethrough will be proportionate to the size of the coils. Taking these elements into consideration, however, if the elements 14 or 15 be elevated from the central position at which they are illustrated, impedance will be introduced in the coil 11, reducing the current flow therethrough and correspondingly increasing the current flow through the coil 23, with the result that the coil sections 23 and 24 are unbalanced and the effective center of the coil 22 is shifted from the center of the coil 22 to a point spaced from the center of this coil in the direction of the free end of the coil 23 a distance proportionate to the amount of current which now flows through the coils 23 and 24. This will result in a movement of the pen 27 and a change of indication. If the member 14 moves upwardly and the member 15 simultaneously moves downwardly a distance such that the impedance introduced into the coil sections 11 and 12 is equal, then the proportionate current flowing through the coils 23 and 24 is not altered and the position of the armature 25 remains unaffected.

It will be obvious that the elements 14 and 15 may be shifted through any desired medium. In the present instance, we have illustrated the meter as a compensating electrical hydrometer, compensation being made for temperature variations of the hydrometer reading. In the construction illustrated, we have shown a main tank 32 and a sub tank 33. The sub tank 33 merely acts as a control for the liquid level in the tank 32 and is provided with an enlarged outlet 34 of greater size than the inlet 35 to the main tank 32. Within the tank 32 is arranged a hydrometer float 36 to which are connected the rods 18. This hydrometer float is in the form of a ring and at the center or axis of this ring a mercury receptacle 37 is submerged in the float of the tank. This mercury receptacle has a relatively small neck 38 within which operates a piston 39 which is shifted by the rise and fall of the mercury, due to changes of temperature and is connected to the operating rod 19 of the core 15.

It will be obvious that variations in density of the fluid being gauged will shift the core 14 to effect a corresponding movement of the pen 27. This movement of the pen will be affected by temperature changes of the fluid through the corresponding shifting movements of the core 15, so that the output or indication at the pen will be accurate.

In Figure 4, we have illustrated a slight modification of the structure of Figure 1, in that instead of a single control coil 10, we have provided two control coils 40 and 41 which are identical with the control coil 10, with the exception of the fact that instead of being provided with two movable cores, a single movable core 42, 43 is employed in each instance. These control coils 40 and 41 are connected with the operating coil 22 in exactly the same manner as the control coil 11 is connected therewith, both the control coils 40 and 41 being in parallel with the operating coil 22 and having the connection between adjacent ends of their coil sections, which sections are indicated at 44 and 45, connected with the connection between the coil sections 23 and 24 of the operating coil 22. The coils 40 and 41 perform exactly the functions which are performed by the coil 10, but present the advantage of requiring no specially constructed hydrometer float for the actuation of the core 42 of the coil 40. It will be obvious that with the construction illustrated in Figure 5 it will also be much easier to arrive at an accurate proportion for the cores and coils of the control mechanism.

While the device has been above referred to solely as employed as a hydrometer, it will be obvious from an inspection of Figures 6 to 9 that it is capable of a much wider range of use. For example, in Figure 6, we have shown a compensating recorder mechanism employed as a flow meter, wherein compensation is had for pressure, temperature and specific gravity. In this figure, the operating coil 22 is paralleled by control coils 46, 47 and 48. The control coils 46 and 47 are similar to the control coils 40 and 41 and have their cores controlled respectively by a flow meter 48a and a pressure meter 49. The control coil 48 is similar to the control coil 10 and has its cores actuated by a compensating hydrometer mechanism, generally designated at 50, and similar to the mechanism illustrated in Figure 1 for the operation of the coil 10.

It will be obvious that by omitting the mechanism to the left of the dotted line of Figure 6, a flow meter compensated for errors due to pressure will be produced, while by omitting the coil 47 and its pressure gauge 49, a flow meter is produced which is compensated for only for hydrometrical errors.

In Figure 7, we have illustrated a plurality of mechanisms, such as shown in Figure 1, wherein by means of control switches 51, a master operating coil 52 may be caused to reproduce the reading of any selected recorder. A structure of this character may be conveniently employed for providing an instant check at a remote office of the specific gravity of a liquid in any number of tanks or conduits. In this construction, the operating coils and control coils are identical with those in Figure 1 and are indicated by similar ordinals.

In Figure 8, we have illustrated the use of the operating coil 22 with control coils 53 similar to the coils 40 and 41 for giving the aggregate liquid contents of a plurality of tanks 54. In each tank, a float 55 may be arranged for the operation of the cores 56 of the control coils 53.

In Figure 9, we have illustrated the method of providing both aggregate and individual indications of a plurality of meters constructed in accordance with our invention. In this figure, we have shown a plurality of conduits 57, each having associated therewith a flow meter operating the core 58 of a control coil 59. Each control coil parallels a pair of operating coils 22, one of which may operate a recorder and the other of which operates an indicator, as generally designated. Each control coil 58 has the upper guide rod 60 of its core 58 connected to the core 61 of an associated control coil 62. The control coils 62 are arranged in parallel with the control coil 22 operating a total flow recorder at which the total flow through the conduits 57 will be recorded. It will, of course, be obvious that each individual recording mechanism associated with a conduit 57 could be a compensated flow meter, such as illustrated in Figure 6, and under these circumstances, a true flow reading would be obtained in the individual recorders and indicators and at the total flow recorded.

From the foregoing, it will be obvious that a device of this character readily lends itself to use in a great many situations and, at the same time, may be comparatively cheaply and readily constructed. It will furthermore be obvious that the construction illustrated is capable of a certain range of change and modification without materially departing from the spirit of the invention and we accordingly do not limit ourselves to such specific structure except as hereinafter claimed.

We claim:—

1. In a liquid density measuring instrument, a variable inductance system therefor including an inductance coil and relatively movable cores therefor, a chamber adapted to permit the liquid to flow therethrough and maintain the liquid therein at a constant level, a hydrometer float in the liquid in the chamber and connected to one of said cores to vary the position of the core in the coil as the density of the liquid varies, a mercury container arranged in the chamber and surrounded by the liquid, and a float resting upon the mercury and connected to the other of said cores to vary the position thereof in the coil as the temperature of the liquid varies.

2. In a liquid density measuring instrument, a variable inductance system therefor including an inductance coil and relatively movable cores therefor, the cores being hollow and arranged one within the other and within the coil, a chamber adapted to permit the liquid to flow therethrough and maintain the liquid therein at a constant level, a hydrometer float in the liquid in the chamber, means holding one of the cores in concentric relation to the coil and connecting the float to the core, a mercury container arranged in the chamber and surrounded by the liquid, a float resting upon the mercury in the chamber, and means holding the other core in concentric relation to the coil and connecting the second float thereto.

3. In a device for indicating or recording the resultant of a plurality of variables, a pair of inductance coils, said coils being interconnected at their centers and at their two outer ends and at which points on alternating electric current is introduced in said coils, a pair of cores in one of said coils, said cores being hollow and one being positioned within the other, and means for moving said cores independently of each other, a core in the second said coil, means on the core in second said coil for operating an indicating or recording instrument by the upward or downward movement of the core in the second said coil which is caused by the varied positions of the cores in the first said coil all substantially as shown and described.

4. In a device for indicating or recording the resultant of a plurality of variables, a plurality of operating coils and an indicating coil, all of said coils being interconnected at their centers and at their two outer ends at which points an alternating electric current is introduced in each of said coils, a movable core in each of said coils, means for variable positioning of the cores in each of said operating coils whereby the current in the sections of the indicating coil will cause the core therein to take a resulting position fixed by the cores in the plurality of the operating coils, and means on the core in said indicating coil for operating a recording instrument as described.

CLARENCE A. RENNICK.
OLIVER B. CURRY.